United States Patent
Gupta et al.

(10) Patent No.: US 8,032,882 B2
(45) Date of Patent: Oct. 4, 2011

(54) SYSTEM AND METHOD FOR CONTROLLING AGGREGATE CPU USAGE BY VIRTUAL MACHINES AND DRIVER DOMAINS

(75) Inventors: Diwaker Gupta, Fort Collins, CO (US); Ludmila Cherkasova, Fort Collins, CO (US); Robert D. Gardner, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1466 days.

(21) Appl. No.: 11/493,348

(22) Filed: Jul. 26, 2006

(65) Prior Publication Data

US 2008/0028397 A1   Jan. 31, 2008

(51) Int. Cl.
*G06F 9/455* (2006.01)
(52) U.S. Cl. ......................................................... 718/1
(58) Field of Classification Search ....................... 718/1
See application file for complete search history.

(56) References Cited

U.S. PATENT DOCUMENTS

| | | | |
|---|---|---|---|
| 5,675,762 A | 10/1997 | Bodin et al. | |
| 6,463,352 B1 | 10/2002 | Tadokoro et al. | |
| 7,096,469 B1 * | 8/2006 | Kubala et al. | 718/100 |
| 2005/0120104 A1 * | 6/2005 | Boon et al. | 709/223 |
| 2007/0271560 A1 * | 11/2007 | Wahlert et al. | 718/1 |

OTHER PUBLICATIONS

Barham, P. et al., "Xen and the Art of Virtualization", In SOSP '03: Proceedings of the nineteenth ACM symposium on Operating systems principles, pp. 164-177.
Cherkasova, L. et al., "Measuring CPU Overhead for I/O Processing in the Xen Virtual Machine Monitor"; Accepted to 2005 Usenix Annual Technical Conference; 6 pages.
Chase, Jeffrey et al., Sharing and Protection in a Single-Address-Space Operating System, ACM Trans. Comput. Syst., 12(4), 1994; pp. 271-307.
Chun, Brent et al., "PlanetLab: An Overlay Testbed for Broad-Coverage Services", SIG-COMM Comput. Commun. Rev., 33(3); 2003, pp. 3-12.
Druschel, Peter et al., "Lazy Receiver Processing (LRP): A Network Subsystem Architecture for Server Systems", In OSDI '96: Proceedings of the second USENIX symposium on Operating systems design and implementation, New York 1996, pp. 261-275.
Fraser, K. et al., "Reconstructing I/O", Technical Report UCAM-CL-TR-596, University of Cambridge, 2005; pp. 1-16.
Gupta, D. et al., "XenMon: QoS Monitoring and Performance Profiling Tool"; Technical Report HPL-2005-187, HP Labs, 2005, pp. 1-13.

(Continued)

*Primary Examiner* — Meng An
*Assistant Examiner* — Blake Kumabe

(57) ABSTRACT

A method comprises determining an aggregate usage of CPU attributable to a given virtual machine (VM), wherein the aggregate usage of CPU attributable to the given VM includes a determined amount of CPU usage by a driver domain, such as by a network driver domain, that is attributable to the given VM. The method further comprises scheduling, by an aggregate proportional-share scheduler, CPU access to the given VM based at least in part on the determined aggregate usage of CPU attributable to the given VM.

15 Claims, 6 Drawing Sheets

DETERMINE AN AGGREGATE USAGE OF CPU ATTRIBUTABLE TO EACH OF A PLURALITY OF DIFFERENT VM'S, WHEREIN SUCH AGGREGATE USAGE OF CPU ATTRIBUTABLE TO EACH VM INCLUDES A DETERMINED AMOUNT OF CPU USAGE BY A DRIVER DOMAIN THAT IS ATTRIBUTABLE TO THE VM

— 221

SCHEDULE, BY AN AGGREGATE PROPORTIONAL-SHARE SCHEDULER, CPU ACCESS TO THE VM'S BASED AT LEAST IN PART ON THEIR RESPECTIVE AGGREGATE USAGE OF CPU IN PROPORTION TO THEIR RESPECTIVE ASSIGNED RELATIVE WEIGHTS

— 222

OTHER PUBLICATIONS

Httperf. [online] Retrieved Jul. 12, 2006 Retrieved from: 1 page.

IBM. The Oceano Project; [online] Retrieved on Jul. 11, 2006 Retrieved from: 1 page.

Kallahalla, M. et al., "Soft UDC: A Software-Based Data Center for Utility Computing", IEEE Computer, No. 2004, pp. 46-54.

Leslie, Ian et al., "The Design and Implementation of an Operating System to Support Distributed Multimedia Applications", IEEE Journal of Selected Areas in Communications, 14(7), 1996, pp. 1280-1297.

Mogul, J.C., et al, "Eliminating Receive Livelock in an Interrupt-driven Kernel"; ACM Trans. Comput. Syst., 15(3), 1997, 14 pages.

Nagar, S., et al., "Improving Linux Resource Control Using CKRM", Ottawa Linux Symposium, 2004, 16 pages.

Waldspurger, C. et al., "Memory Resource Management in VMware ESX Server", SIGOPS Oper. Syst. Rev., 36(SI), 2002 pp. 181-194.

Whitaker, A. et al., "Scale and Performance in the Denali Isolation Kernal"; SIGOPS Oper. Syst. Rev., 36(SI), 2002, pp. 195-209.

U.S. Appl. No. 11/070,674, filed Mar. 2, 2005.

\* cited by examiner

FIG. 1

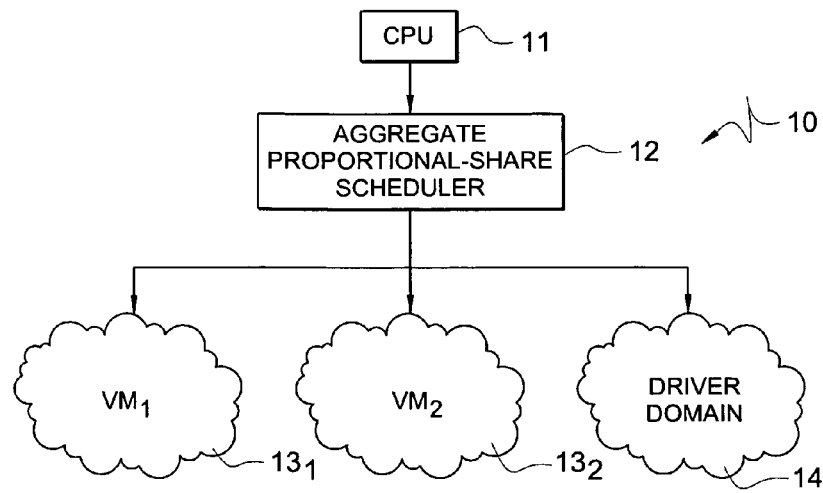

FIG. 2A

| DETERMINE AN AGGREGATE USAGE OF CPU ATTRIBUTABLE TO A GIVEN VM, WHEREIN SUCH AGGREGATE USAGE OF CPU ATTRIBUTABLE TO THE GIVEN VM INCLUDES A DETERMINED AMOUNT OF CPU USAGE BY A DRIVER DOMAIN THAT IS ATTRIBUTABLE TO THE GIVEN VM |
|---|

↘ 201

| SCHEDULE, BY AN AGGREGATE PROPORTIONAL-SHARE SCHEDULER, CPU ACCESS TO THE GIVEN VM BASED AT LEAST IN PART ON THE DETERMINED AGGREGATE USAGE OF CPU ATTRIBUTABLE TO THE GIVEN VM |
|---|

| DETERMINE AN AGGREGATE USAGE OF CPU ATTRIBUTABLE TO EACH OF A PLURALITY OF DIFFERENT VM'S, WHEREIN SUCH AGGREGATE USAGE OF CPU ATTRIBUTABLE TO EACH VM INCLUDES A DETERMINED AMOUNT OF CPU USAGE BY A DRIVER DOMAIN THAT IS ATTRIBUTABLE TO THE VM |
|---|

↘ 221

| SCHEDULE, BY AN AGGREGATE PROPORTIONAL-SHARE SCHEDULER, CPU ACCESS TO THE VM'S BASED AT LEAST IN PART ON THEIR RESPECTIVE AGGREGATE USAGE OF CPU IN PROPORTION TO THEIR RESPECTIVE ASSIGNED RELATIVE WEIGHTS |
|---|

↘ 222

SYSTEM AND METHOD FOR CONTROLLING AGGREGATE CPU USAGE BY VIRTUAL MACHINES AND DRIVER DOMAINS

CROSS-REFERENCE TO RELATED APPLICATIONS

This application is related to co-pending and commonly assigned U.S. patent application Ser. No. 11/070,674 filed Mar. 2, 2005 titled "SYSTEM AND METHOD FOR ATTRIBUTING TO A CORRESPONDING VIRTUAL MACHINE CPU USAGE OF AN ISOLATED DRIVER DOMAIN IN WHICH A SHARED RESOURCE'S DEVICE DRIVER RESIDES", the disclosure of which is hereby incorporated herein by reference. This application is also related to the following concurrently filed and commonly assigned U.S. patent applications: 1) Ser. No. 11/491,506 titled "SYSTEM AND METHOD FOR ATTRIBUTING TO A CORRESPONDING VIRTUAL MACHINE CPU UTILIZATION OF A NETWORK DRIVER DOMAIN BASED ON OBSERVED COMMUNICATION THROUGH A VIRTUALIZED INTERFACE"), 2) Ser. No. 11/493,492 titled "SYSTEM AND METHOD FOR ATTRIBUTING TO A CORRESPONDING VIRTUAL MACHINE CPU UTILIZATION OF A NETWORK DRIVER DOMAIN BASED ON WEIGHTED COMMUNICATION"), 3) Ser. No. 11/493,250 titled: "SYSTEM AND METHOD FOR CONTROLLING AGGREGATE CPU USAGE BY VIRTUAL MACHINES AND DRIVER DOMAINS OVER A PLURALITY OF SCHEDULING INTERVALS", 4) Ser. No. 11/493,179 titled "SYSTEMS AND METHODS FOR FLEXIBLY CONTROLLING RESOURCE USAGE BY A DRIVER DOMAIN ON BEHALF OF A VIRTUAL MACHINE", and 5) Ser. No. 11/494,187 titled "SYSTEMS AND METHOD FOR CONTROLLING RESOURCE USAGE BY A DRIVER DOMAIN ON BEHALF OF A VIRTUAL MACHINE", the disclosures of which are hereby incorporated herein by reference.

FIELD OF THE INVENTION

The below description is related generally to controlling resource utilization, and more particularly to a CPU scheduler that schedules CPU for a virtual machine based on an aggregate usage of CPU for the virtual machine and a driver domain, such as an isolated driver domain.

DESCRIPTION OF RELATED ART

Resource pools are collections of computing resources, such as clusters of servers, racks of blades, or other computing resources. The utility data center (UDC) available from Hewlett-Packard Company is one example of a resource pool. Depending on the granularity of a given implementation, a resource pool may be a collection of separate computing devices (e.g., separate servers, separate clusters of servers, etc.) or it may be a collection of resources on a common computing device (e.g., multiple processors on a single server). Various types of resource pools are known, and techniques have been developed for managing access to such resource pools. For instance, virtualization services have been developed that offer interfaces that support the lifecycle management (e.g., create, destroy, move, size capacity) of resource containers (e.g., virtual machines, virtual disks) that provide access to shares of capacity. Various consumers (e.g., applications) may share access to the resources of a resource pool. That is, various consumers may share utilization of the resources in a resource pool for servicing their respective workloads. In this sense, a "consumer" refers to anything (e.g., process, etc.) that consumes capacity of the pool's resources. A consumer generally consumes capacity for use in servicing the consumer's workload. Thus, the consumer has a "demand" for capacity from the resource pool for servicing its workload in a desired manner. In some implementations, workloads are assigned to the resource containers which are then associated with resources. A "processor resource," as used herein, refers to any computing resource now known or later developed that a consumer utilizes in servicing a workload, including without limitation central processing unit(s) (CPU(s)).

To facilitate sharing of a resource pool's capacity between a plurality of consumers (e.g., a plurality of applications), some type of scheme for managing allocation of the pool's capacity among the consumers may be employed. Without such management of allocation, a given consumer may consume all or substantially all of the pool's capacity for servicing its workload, thus leaving the remaining consumers with insufficient capacity for supporting their respective workloads. Accordingly, consumers generally desire some assurance that they will be allocated sufficient capacity of the resource pool to enable the consumers to satisfy their respective quality of service (QoS) goals. As discussed further below, schedulers may be configured to allocate capacity of a resource pool among the consumers in an attempt to manage such allocation in a manner that provides some assurance that the consumers can satisfy their QoS goals (e.g., by balancing allocation among the consumers).

Each resource in a pool may have a processor scheduler that monitors its workloads' demands and dynamically varies the allocation of processor capacity, e.g., CPU, to the workloads, thereby managing the utilization of the processor resources by the various consumers. For instance, the scheduler may dynamically vary allocation of the processor's capacity in a manner that attempts to provide each consumer with access only to the capacity it needs (for servicing its current workload). As a workload's demand increases, the scheduler may increase the amount of the processor's capacity that is allocated to such workload; and as a workload's demand decreases, the scheduler may decrease its allocation of the processor's capacity to such workload. Schedulers are well known for scheduling access to shared processor resources for competing consumers.

Traditionally, general-purpose operating systems assume that they have complete control of a system's physical resources. The operating system ("OS") thus assumes responsibility for such system management as allocation of physical resources, communication, and management of external storage, as examples. Virtualization changes this assumption of sole responsibility by a single OS for management of the system. Similar to the way that a general-purpose OS presents the appearance to multiple applications that each has unrestricted access to a set of computing resources, a virtual machine manages a system's physical resources and presents them to one or more OSs, thus creating for each OS the illusion that it has full access to the physical resources that have been made visible to it.

The current trend toward virtualized computing resources and outsourced service delivery has caused interest to surge in Virtual Machine Monitors (VMMs) that enable diverse applications to run in isolated environments on a shared hardware platform. A VMM is a layer of software that runs on a host platform and provides an abstraction of a complete computer system to higher-level software. That is, a VMM, which may also be referred to as a "hypervisor," is a software layer that virtualizes the available resources of a computer and multiplexes them among one or more guest OSs on the computer system. Many such VMMs are available in the art, such as the VMM known as VMware™ available from VMware, Inc. (see http://www.vmware.com). An abstraction created by VMM is called a virtual machine (VM). Accordingly, a VMM aids in subdividing the ample resources of a modern computer and creating the illusion of multiple virtual machines each running a separate OS instance.

Traditionally, schedulers separately schedule CPU access for different VMs and driver domains. As an example, a weighted proportional-share scheduler may schedule CPU access to different VMs in proportion to a respective weight assigned to each VM. However, a VM may require an access of a device driver in a driver domain, and thus the device driver may consume additional CPU utilization on behalf of the requesting VM. As such, the combined CPU utilization of a VM and a driver domain on behalf of such VM may effectively cause the total CPU usage attributable to the VM to become out of proportion to the VM's respective weight. Thus, a desire exists for a scheduler that is operable to schedule CPU access for VMs in a manner that provides CPU access in proportion to respective weightings of the VMs for each VM's aggregate CPU usage. That is, a desire exists for a weighted proportional-share scheduler that fairly allocates CPU usage to VMs taking into consideration aggregate CPU utilization of a VM and of a driver domain that is attributable to the VM.

BRIEF DESCRIPTION OF THE DRAWINGS

FIG. 1 shows an exemplary system according to an embodiment of the present invention;

FIGS. 2A-2B show exemplary operational flows according to certain embodiments of the present invention;

DETAILED DESCRIPTION

Figure 3:
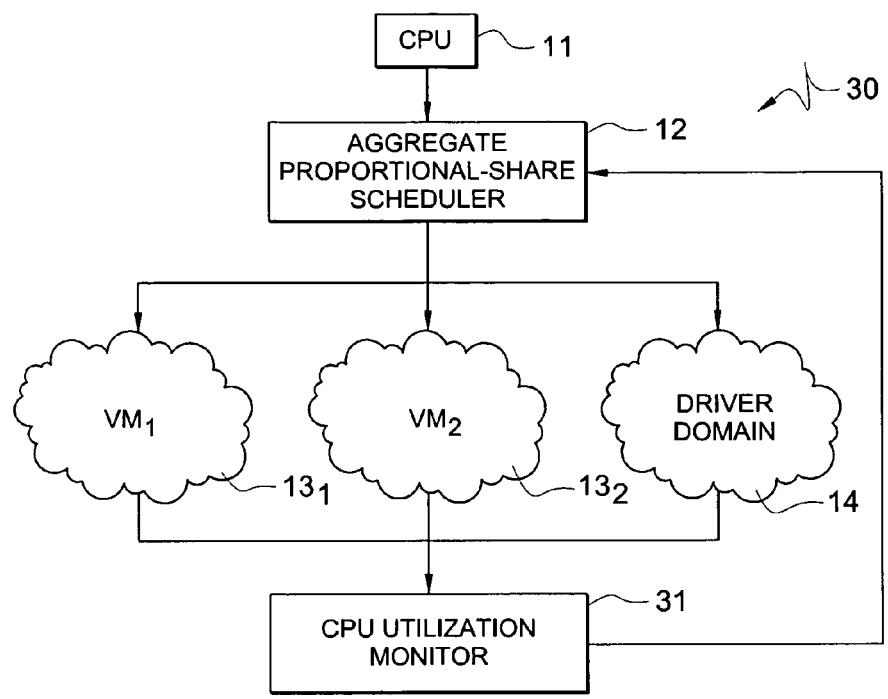
FIG. 3 shows an exemplary system according to one embodiment of the present invention.

FIG. 1 shows an exemplary system according to an embodiment of the present invention. System 10 comprises an aggregate proportional-share scheduler 12, embodiments of which are described further herein. Aggregate proportional-share scheduler 12 schedules access to CPU 11 for various consumers, such as virtual machines (VMs) $13_1$ and $13_2$ and driver domain 14. While 2 VMs and 1 driver domain are shown for simplicity in FIG. 1, any number of such VMs and driver domains may be implemented in a given system for which aggregate proportional-share scheduler 12 schedules access to CPU 11. Also, CPU 11 may comprise any number of CPUs. The term "CPU" is used broadly herein to refer to any processing logic for processing demands of a consumer's workload.

As described further herein, driver domain 14 comprises a device driver that may be used by VMs $13_1$ and $13_2$ for accessing a shared resource. For instance, driver domain 14 may be a network driver domain that comprises a device driver for a network interface, which VMs $13_1$ and $13_2$ may use to access a communication network. Such a device driver thus uses CPU 11 for servicing the requests of the VMs $13_1$ and $13_2$. Accordingly, as described further herein, a corresponding amount of CPU usage by the driver domain 14 on behalf of a VM may be attributed to such VM. In general, an amount of resource usage by the driver domain 14 is considered as being "on behalf" of a given VM when the resource usage by the driver domain 14 is incurred for servicing demands of the given VM. Embodiments of aggregate proportional-share scheduler 12 presented herein take into consideration not only the CPU usage of an individual VM, but also the CPU usage of driver domain 14 that is attributable to the VM, for scheduling CPU access for the VM. That is, aggregate proportional-share scheduler 12 considers an aggregate of CPU usage attributable to a given VM, including CPU usage of driver domain 14 that is attributable to the given VM, in scheduling shares of CPU to the given VM in proportion to the respective weight assigned to the given VM.

Various types of weighted proportional-share CPU schedulers are known, and any weighted proportional-share scheduler now known or later developed may be adapted according to embodiments of the present invention in order to schedule CPU access for VMs based on an aggregate of CPU usage attributable to each VM. As one example, an embodiment that adapts the well-known SEDF scheduler for implementing aggregate proportional-share scheduler 12 is described further herein. Again, embodiments of the present invention are not limited to the SEDF scheduler, but may be utilized for adapting any weighted proportional-share CPU scheduler in the manner described herein.

As mentioned above, traditionally weighted proportional-share schedulers schedule CPU access to VMs without considering any CPU usage of a driver domain that is attributable to the VMs. Thus, a given VM may consume more than its proportional share of CPU usage when considering CPU usage of a driver domain that is attributable to the given VM in addition to the given VM's direct usage of CPU. For example, suppose that VMs $13_1$ and $13_2$ are weighted equally such that they each should receive equal shares of CPU, say a 30% share of each scheduling interval. In this manner, a weighted proportional-share scheduler may have scheduling intervals of 100 milliseconds (ms) each, for example, wherein the scheduler will schedule 30 ms of CPU access to each of VMs $13_1$ and $13_2$ during each scheduling interval. In this manner, the scheduler attempts to fairly allocate CPU capacity to the VMs in proportion to their respective weights, which are equal in this example. However, suppose that during a given scheduling interval driver domain 14 consumes some amount of CPU capacity on behalf of VM $13_1$. Because the traditional scheduler schedules CPU usage to each VM and driver domain independently without any consideration of the CPU usage of the driver domain that is attributable to the VMs, the VM $13_1$ may receive a disproportionate amount of aggregate CPU usage. That is, the scheduler may schedule a 30% share of a scheduling interval to each of VMs $13_1$ and $13_2$, and the scheduler may also schedule an additional share of CPU capacity to driver domain 14, which driver domain 14 uses to process a request from VM $13_1$. Thus, in this example, when considering the aggregate of VM $13_1$'s allocated CPU and the CPU usage of driver domain 14 that is on behalf of VM $13_1$, VM $13_1$ effectively receives an aggregate CPU usage that is disproportionate to its assigned weight. Embodiments of the present invention address this issue, and provide techniques that enable a scheduler to perform weighted proportional-share scheduling fairly when considering an aggregate of CPU usage attributable to each VM, including CPU usage of a driver domain that is attributable to the VM.

Thus, embodiments of the present invention provide systems and methods for controlling aggregate CPU usage by VMs $13_1$ and $13_2$ and driver domains 14. For instance, certain embodiments of the present invention provide a weighted proportional-share scheduler 12 for scheduling access to CPU 11 for VMs $13_1$ and $13_2$ in proportion to their respective weights taking into account aggregate CPU usage of the VMs themselves and the CPU usage by driver domain(s) 14 attributable to the VMs.

As described above, virtualization enables resources to be shared between a plurality of VMs. A VMM is a software layer that virtualizes the available resources of a computer system and multiplexes them among one or more guest OSs on the computer system. As used herein, the term guest operating system refers to one of the OSs that the VMM can host, and the term domain refers to a running virtual machine within which a guest OS executes. Thus, the terms virtual machine (VM) and domain are used interchangeably herein. A privileged management domain refers to a domain that manages the creation and/or termination of other guest domains and may manage other parameters, such as CPU scheduling parameters, resource allocation policies, etc. A driver domain refers to a domain in which a device driver for one or more shared resources resides. An isolated driver domain refers to a domain in which a device driver is placed such that failure of the device driver does not interrupt any other domains in the system. The VMM may be referred to as a hypervisor because it operates at a higher privilege level than the supervisor code of the guest OSs that it hosts. Thus, the terms VMM and hypervisor are used interchangeably herein.

Typically, VMMs are classified into two groups: 1) "Type I VMMs" that run directly on physical hardware and thus provide an abstraction that is identical to the hardware underneath the VMM, such as IBM's VM/370; and 2) "Type II VMMs" that run as an application on a host operating system, such as user-mode Linux. Type I and Type II machines are available in the art. For instance, VMWare, Inc. provides both types of VMMs. In a traditional Type I VMM, the exposed virtual hardware functionality is identical to the underlying machine. This "full virtualization" has the main benefit of allowing unmodified OSs to be hosted. However, support for full virtualization was never a part of prevalent IA-32 (e.g., x86) architecture, and the efficient virtualization is difficult, i.e., it can be only achieved at the cost of increased complexity and reduced performance.

Several aspects of virtualization make it difficult or slow for a VMM to provide an interface that is identical to the physical hardware. For instance, some architectures include instructions whose behavior depends on whether the CPU is running in privileged or user mode (sensitive instructions), yet which can execute in user mode without causing a trap to the VMM. Virtualizing these sensitive-but-unprivileged instructions generally requires binary instrumentation, which adds significant complexity and may add significant overhead. For example, VMware's ESX Server dynamically rewrites portions of the hosted machine code to insert traps wherever VMM intervention might be required. In addition, emulating I/O devices at the low-level hardware interface (e.g. memory-mapped I/O) causes execution to switch frequently between the guest OS accessing the device and the VMM code emulating the device. To avoid the overhead associated with emulating a low-level device interface, most VMMs encourage or require the user to run a modified version of the guest OS. For example, the VAX VMM security kernel, VMware Workstation's guest tools add special drivers in the guest OS to accelerate the virtualization of some devices.

Another virtualization technique, called paravirtualization, has been recently introduced, that avoids the drawbacks of full virtualization by presenting a virtual model machine abstraction that is similar but not identical to the underlying hardware. This technique provides improved performance, but it also requires modification to the guest OSs, i.e. the commodity system needs to be ported to a paravirtualized environment. Xen™ is an example of a known VMM for x86 based on the paravirtualization technique, which supports execution of multiple guest OSs and that does not require changes to the application binaries interfaces (ABI), and hence no modifications are required to guest applications. Xen is an open source VMM, and the latest stable release of Xen is version 3.0.1. In certain virtualization techniques, device drivers for shared resources are located in a privileged management domain, and thus to access those shared resources the virtual machines communicate with such privileged management domain. Further, in certain virtualization techniques, device drivers for shared resources are located in an isolated driver domain to improve dependability, maintainability, and manageability of the shared resources.

For various reasons, including without limitation management of resource allocation, it is often desirable to monitor the CPU utilization that is attributable to each of the VMs that may be implemented on a system. Traditional monitoring systems typically report the amount of CPU allocated by the scheduler for execution of a particular VM over time. However, this method often fails to reveal the "true" usage of the CPU by different VMs. For instance, in certain virtualization techniques, device drivers for shared resources are located in isolated driver domains, and thus to access those shared resources the VMs communicate with such isolated driver domains. Accordingly, the isolated driver domains use the CPU in processing the access requests received from the VMs. The CPU utilization of the isolated driver domains in servicing the requests of each VM (requesting to access a resource) are not attributed to the corresponding VMs in the traditional technique of monitoring VM CPU utilization (i.e., as those techniques report the amount of CPU allocated to a VM by the scheduler). Thus, the full CPU utilization of the VMs, including the corresponding isolated driver domain CPU utilization, is not determined.

For example, virtualization of input/output (I/O) devices results in an I/O model where the data transfer process involves additional system components, such as an isolated driver domain in which device drivers for the I/O resources reside. Hence, the CPU usage when the isolated driver domain handles the I/O data on behalf of a particular VM should be charged to the corresponding VM. However, simply monitoring the CPU utilization allocated by the scheduler to the corresponding VM fails to account for the CPU utilization of the isolated driver domain in handling the I/O data on behalf of such corresponding VM. Thus, the traditional technique of determining CPU utilization of each VM does not fully capture the CPU utilization attributable to a VM, as it fails to account for the corresponding isolated driver domain CPU utilization that is performed for each VM.

Certain techniques for observing communication between a VM and an isolated driver domain and attributing to the VM corresponding CPU usage of the isolated driver domain are described in co-pending and commonly assigned U.S. patent application Ser. No. 11/070,674 filed Mar. 2, 2005 titled "SYSTEM AND METHOD FOR ATTRIBUTING TO A CORRESPONDING VIRTUAL MACHINE CPU USAGE OF AN ISOLATED DRIVER DOMAIN IN WHICH A SHARED RESOURCE'S DEVICE DRIVER RESIDES", the disclosure of which is hereby incorporated herein by reference. Certain embodiments presented therein attribute such CPU usage of an isolated driver domain to a corresponding VM based on a memory page exchange count. While such usage of memory page exchange count may provide a good estimate, it may introduce some inaccuracy due, for example, to the specific memory page exchange procedure employed by the VMM. For instance, often the VMM commercially known as Xen-3™ opportunistically performs additional memory page exchanges in order to keep a sufficient pool of memory pages in an isolated driver domain. Due to Direct Memory Access (DMA), some of the I/O data from a VM can be directly written to memory in an isolated driver domain ("IDD").

Certain embodiments of concurrently filed and commonly assigned U.S. patent application Ser. No. 11/493,506 titled "SYSTEM AND METHOD FOR ATTRIBUTING TO A CORRESPONDING VIRTUAL MACHINE CPU UTILIZATION OF A NETWORK DRIVER DOMAIN BASED ON OBSERVED COMMUNICATION THROUGH A VIRTUALIZED INTERFACE", the disclosure of which is incorporated herein by reference, provide a more accurate technique for observing communication between a VM and a network driver domain (e.g., an isolated network driver domain ("net-IDD")) and attributing to the VM corresponding CPU usage of the network driver domain, by observing the amount of communication flowing through a virtualized interface between such VM and the network driver domain. That is, in U.S. patent application Ser. No. 11/493,506 titled "SYSTEM AND METHOD FOR ATTRIBUTING TO A CORRESPONDING VIRTUAL MACHINE CPU UTILIZATION OF A NETWORK DRIVER DOMAIN BASED ON OBSERVED COMMUNICATION THROUGH A VIRTUALIZED INTERFACE" exemplary systems and methods are disclosed for observing an amount of communication through a virtualized interface between a VM and a network driver domain and determining from such observed amount of communication a corresponding amount of the network driver domain's CPU utilization that is attributable to the VM. Thus, a corresponding amount of a network driver domain's CPU utilization to attribute to a VM may be computed based on an amount of communication (e.g., number of network packets) observed through the virtualized interface between the VM and the network driver domain.

In some instances, however, the amount of CPU utilization of a network driver domain may not correspond equally to the amount of communication between the VM and the network driver domain. Rather, the amount of CPU utilization of the network driver domain may differ depending on certain characteristics of the communication. For instance, in some systems the amount of CPU utilization of the network driver domain may differ for different sized packets. Additionally, or alternatively, the amount of CPU utilization of the network driver domain may differ between packets received from a VM directed to the network driver versus packets from the communication network directed to the VM. Thus, certain embodiments of concurrently filed and commonly assigned U.S. patent application Ser. No. 11/493,492 titled "SYSTEM AND METHOD FOR ATTRIBUTING TO A CORRESPONDING VIRTUAL MACHINE CPU UTILIZATION OF A NETWORK DRIVER DOMAIN BASED ON WEIGHTED COMMUNICATION", the disclosure of which is incorporated herein by reference, provide an even further accurate technique attributing a network driver domain's CPU usage to a corresponding VM. In such further accurate technique, a "weighted" amount of communication observed through a virtualized interface between a VM and a network driver domain is determined, wherein such weight is determined at least in part on certain characteristics of the observed communication, such as the size of the observed packets and/or the direction of the packets along a communication path. The "weighted" amount of communication observed may then be used for more accurately determining a corresponding amount of CPU utilization by the network driver domain to attribute to the VM.

Embodiments of the present invention may employ any of the above-identified techniques, or any other technique now known or later developed, for attributing CPU usage of a driver domain to a corresponding VM that caused such CPU usage by the driver domain. As described further herein, once an amount of CPU usage of a driver domain that is attributable to a VM is determined, an aggregate proportional-share scheduler 12 may schedule CPU access to the VM based on the aggregate CPU usage attributable to such VM (e.g., both the VM's direct CPU usage and the CPU usage of a driver domain attributable to the VM).

Turning to FIG. 2A, an exemplary operational flow diagram according to one embodiment of the present invention is shown. In operational block 201, an aggregate usage of CPU attributable to a given VM is determined, wherein such aggregate usage of CPU attributable to the given VM includes a determined amount of CPU usage by a driver domain that is attributable to the given VM. In operational block 202, an aggregate proportional-share scheduler schedules CPU access to the given VM based at least in part on the determined aggregate usage of CPU attributable to the given VM. As described further herein, the scheduler may schedule CPU access in a manner that provides CPU access to the given VM in proportion to a relative weight assigned to the given VM.

In certain embodiments, the aggregate proportional-share scheduler may schedule CPU access for each of a plurality of different VMs in proportion to their respective assigned weights, taking into consideration the aggregate usage of CPU attributable to each of the different VMs. Thus, as shown in FIG. 2B, in certain embodiments an aggregate usage of CPU attributable to each of a plurality of different VMs is determined, in block 221, wherein such aggregate usage of CPU attributable to each VM includes a determined amount of CPU usage by a driver domain that is attributable to the VM. In operational block 222, an aggregate proportional-share scheduler schedules CPU access to the VMs based at least in part on their respective aggregate usage of CPU in proportion to their respective assigned relative weights.

FIG. 3 shows an exemplary system 30 according to one embodiment of the present invention. As with system 10 of FIG. 1, system 30 comprises aggregate proportional-share scheduler 12, embodiments of which are described further herein. Aggregate proportional-share scheduler 12 schedules access to CPU 11 for various consumers, such as virtual machines (VMs) $13_1$ and $13_2$ and driver domain 14. Embodiments of aggregate proportional-share scheduler 12 presented herein take into consideration not only the CPU usage of an individual VM, but also the CPU usage of driver domain 14 that is attributable to the VM, for scheduling CPU access for the VM. That is, aggregate proportional-share scheduler 12 considers an aggregate of CPU usage attributable to a given VM, including CPU usage of driver domain 14 that is attributable to the given VM, in scheduling shares of CPU to the given VM in proportion to the respective weight assigned to the given VM.

In the exemplary system 30 of FIG. 3, a CPU utilization monitor 31 is included, which is operable to monitor CPU usage of driver domain 14 and attribute the CPU usage of the driver domain 14 to the corresponding VM that caused such CPU usage. That is, driver domain 14 may consume CPU capacity on behalf of a given VM (e.g., for performing tasks requested by a given VM), and CPU utilization monitor 31 may attribute such CPU utilization of the driver domain 14 to the given VM. CPU utilization monitor 31 may employ the techniques described in any of the following co-pending U.S. patent applications, as examples, for attributing CPU utilization of the driver domain 14 to the corresponding VM: 1) U.S. patent application Ser. No. 11/070,674 filed Mar. 2, 2005 titled "SYSTEM AND METHOD FOR ATTRIBUTING TO A CORRESPONDING VIRTUAL MACHINE CPU USAGE OF AN ISOLATED DRIVER DOMAIN IN WHICH A SHARED RESOURCE'S DEVICE DRIVER RESIDES", 2) concurrently filed U.S. patent application Ser. No. 11/493,506 titled "SYSTEM AND METHOD FOR ATTRIBUTING TO A CORRESPONDING VIRTUAL MACHINE CPU UTILIZATION OF A NETWORK DRIVER DOMAIN BASED ON OBSERVED COMMUNICATION THROUGH A VIRTUALIZED INTERFACE", and 3) concurrently filed U.S. patent application Ser. No. 11/493,492 titled "SYSTEM AND METHOD FOR ATTRIBUTING TO A CORRESPONDING VIRTUAL MACHINE CPU UTILIZATION OF A NETWORK DRIVER DOMAIN BASED ON WEIGHTED COMMUNICATION", the disclosures of which are incorporated herein by reference. Of course, other techniques now known or later developed for attributing CPU utilization of a driver domain to a corresponding VM for which the CPU usage is on behalf of may be employed by CPU utilization monitor 31 in other embodiments.

Thus, as shown in FIG. 3, CPU utilization monitor 31 may determine an aggregate amount of CPU usage for each of VMs $13_1$ and $13_2$, including their respective attributed CPU usage by driver domain 14. Aggregate proportional-share CPU scheduler 12 may then use the determined aggregate amount of CPU usage determined by CPU utilization monitor 31 for managing its scheduling of CPU access for the VMs $13_1$ and $13_2$ and/or driver domain 14 to maintain the aggregate CPU usage of each VM in proportion to its respective assigned weight.

Figure 4:
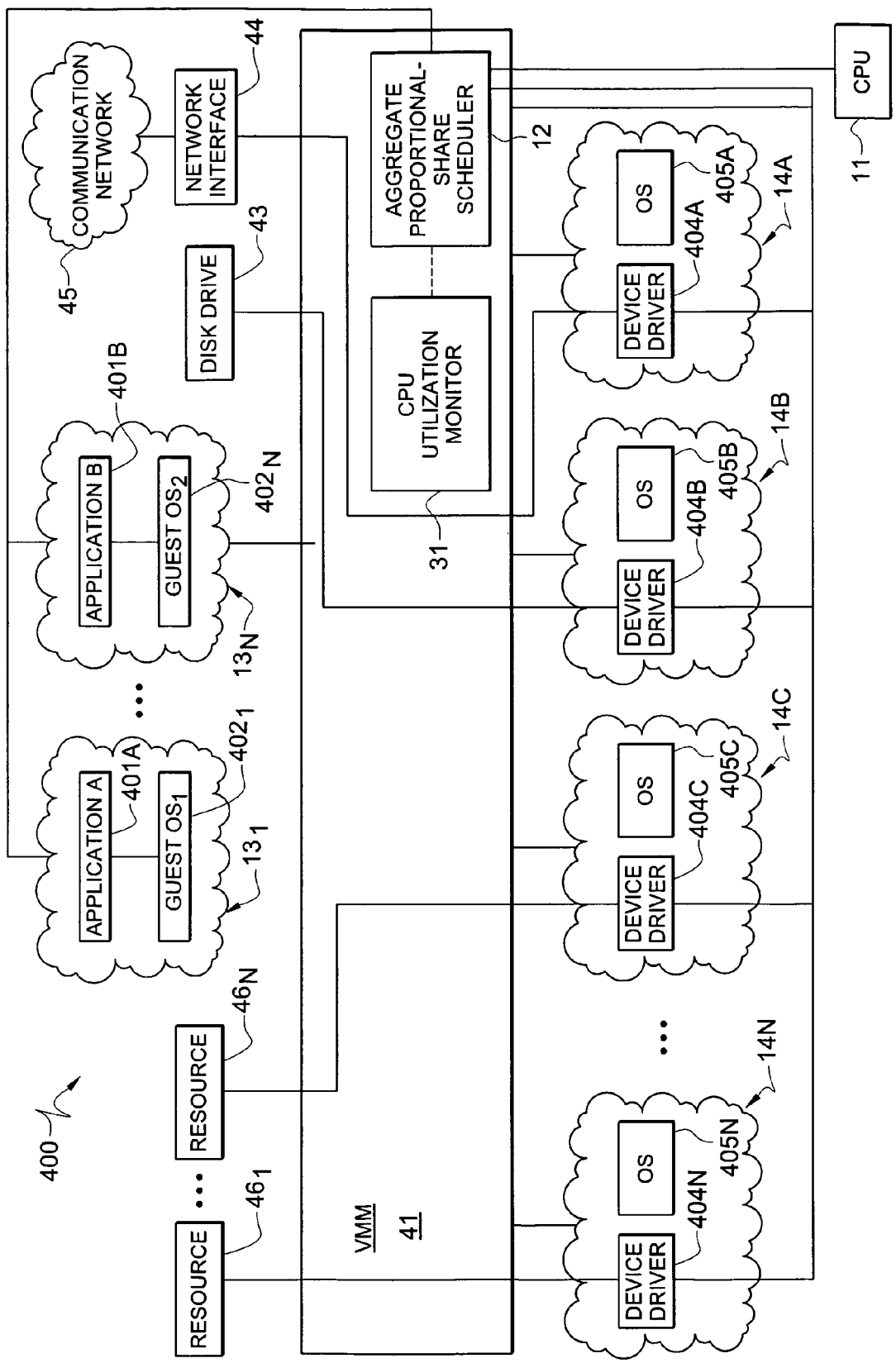
FIG. 4 shows an exemplary virtualized system in which an embodiment of an aggregate proportional-share scheduler is employed.

FIG. 4 shows an exemplary virtualized system in which an embodiment of aggregate proportional-share scheduler 12 is employed. As shown, computer system 400 has any number "N" of VMs or "domains" $13_1, \ldots, 13_N$ implemented thereon (referred to collectively as VMs 13). Such virtualization may be achieved utilizing any suitable technique now known or later discovered. Within each VM 13, a guest OS is executing, such as guest $OS_1$ $402_1$ in VM $13_1$ and guest $OS_N$ $402_N$ in VM $13_N$. Further, one or more applications may be executing within each VM 13, such as application A 401A in VM $13_1$ and application B 401B in VM $13_N$. VMM 41 is implemented, which is a software layer that virtualizes the available resources of computer system 400 and multiplexes them among the various VMs 13 (e.g., the various guest OSs) on the computer system.

System 400 further includes CPU 11, and various shared resources of which VMM 41 manages access by the various VMs 13. The system's shared resources include I/O resources, such as disk drive 43 (e.g., hard drive, floppy drive, tape drive, optical drive, SCSI interface, IDE, etc.) and network interface 44 (e.g., any of a variety of different network interface cards (NICs) and/or adapters), which enables system 400 to interface to communication network 45 (which may be a local area network (LAN), the Internet or other Wide Area Network (WAN), an intranet, a wireless network, telephony network, any combination of the aforementioned networks, and/or any other communication network now known or later developed within the networking arts which permits two or more computers to communicate with each other). The shared resources may include any number of other resources $46_1, \ldots, 46_N$ to which VMM 41 manages access of the VMs 13, examples of which include without limitation memory (e.g., RAM) and block data storage (e.g., disks).

Any number of driver domains, such as driver domains 14A-14N (referred to collectively as driver domains 14), may also be included, each of which contain device drivers for certain ones of the shared resources. In certain embodiments, driver domains 14 may each be an isolated driver domain. In the illustrated example, device drivers 404A-404N (referred to collectively as device drivers 404) are included in domains 14A-14N, respectively, for supporting access to disk drive 43, network interface 44, and resources $46_1, \ldots, 46_N$. In the example shown, device driver 404A for accessing network interface 44 resides in driver domain 14A; device driver 404B for accessing disk drive 43 resides in driver domain 14B; device driver 404C for accessing resource $46_N$ resides in driver domain 14C; and device driver 404N for accessing resource $46_1$ resides in driver domain 14N. In this exemplary virtualized system 400, the VMs 13 communicate (e.g., through a virtualized interface supported by VMM 41) to driver domain 14A for accessing network interface 44, to driver domain 14B for accessing disk drive 43, to driver domain 14C for accessing shared resource $46_N$, and to driver domain 14N for accessing shared resource $46_1$. Each of the driver domains 14 also includes an OS 405, such as OS 405A in driver domain 14A, OS 405B in driver domain 14B, OS 405C in driver domain 14C, and OS 405N in driver domain 14N.

As described above, VMM 41 is a software layer that is commonly implemented in virtualization architectures, which virtualizes the available resources of computer system 400 and multiplexes them among the various VMs 13. Thus, to access certain resources, the VMs 13 communicate via the VMM 41 to the driver domains 14 (e.g., either directly, as in a paravirtualized system, or via the VMM intercepting communication of the VMs, as in many fully-virtualized systems). That is, in certain implementations, the system is paravirtualized, in which the guest OS of each VM 13 is adapted in some manner to communicate with VMM 41. In other implementations, the guest OSs may not be so adapted, but instead the VMM 41 may act to intercept certain resource accesses attempted by the guest OSs, in which case embodiments of the present invention may be employed for any such virtualized system (e.g., fully-virtualized or paravirtualized system).

In certain embodiments, the driver domains 14 are implemented as isolated driver domains (IDDs), which isolate failure of a given driver from causing a failure of any other domains (other driver domains, guest domains (e.g., VMs), etc.). Recent studies show that device drivers are frequently responsible for operating system failures. For example, a study from Stanford university found that the Linux drivers have 3 to 7 times the bug frequency as the rest of the OS. Similarly, product support calls for Windows 2000 showed that device drivers accounted for 27% of crashes compared to 2% for kernel support. Device drivers can be viewed as a type of kernel extensions, added after the fact. Commercial operating systems are typically extended by loading unsafe object code and linking it directly with the kernel. To reduce the risk of device misbehavior and to address problems of dependability, maintainability, and manageability of I/O devices, the Xen-3™ virtualization system available from Hewlett-Packard Company uses the complete original OS itself as the compatibility wrapper for a device driver. The original OS effectively becomes an execution container for the driver. Thus, the exemplary system 400 may include IDDs 14, which include device drivers residing therein. In such an implementation, the device drivers may run unmodified in privileged guest OSs. An IDD in which a device driver for supporting access to a communication network may be referred to as a net-IDD herein.

As shown in FIG. 4, a CPU utilization monitor 31 may be implemented that determines, for each of the VMs 13, a corresponding amount of CPU utilization of driver domains 14 that is attributable to such VM 13. Aggregate proportional-share scheduler 12 may take into consideration the aggregate CPU usage of each of VMs 13, including the corresponding amount of CPU usage of driver domains 14 attributable to each VM, for scheduling CPU usage for such VMs 13, as described further herein.

Figure 5:
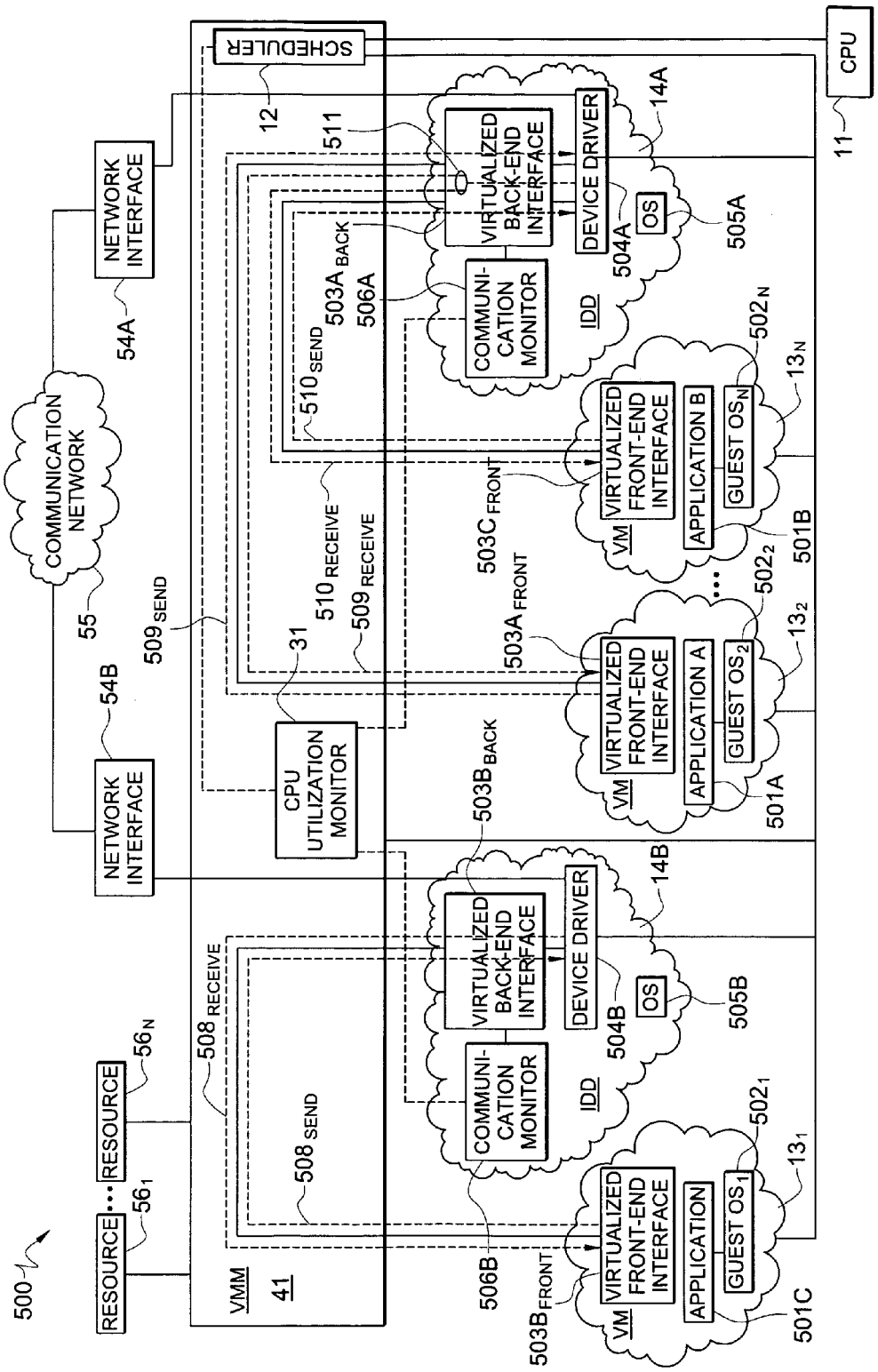
FIG. 5 shows an exemplary system employing an aggregate proportional-share scheduler according to one embodiment of the present invention.

FIG. 5 shows an exemplary system employing aggregate proportional-share scheduler 12 according to one embodiment of the present invention. In this exemplary system 500, a "weighted" amount of communication observed through a virtualized interface between a VM and a network driver domain is determined, wherein such weight is determined at least in part on certain characteristics of the observed communication, such as the size of the observed packets and/or the direction of the packets along a communication path. The weighted amount of communication is determined by communication monitor 506A and/or 506B as described further in concurrently filed U.S. patent application Ser. No. 11/493, 492 titled "SYSTEM AND METHOD FOR ATTRIBUTING TO A CORRESPONDING VIRTUAL MACHINE CPU UTILIZATION OF A NETWORK DRIVER DOMAIN BASED ON WEIGHTED COMMUNICATION", the disclosure of which is incorporated herein by reference. The "weighted" amount of communication observed is used by CPU utilization monitor 31 for accurately determining a corresponding amount of CPU utilization by the network driver domain to attribute to a given VM.

As shown in FIG. 5, computer system 500 has any number "N" of VMs or "domains" $13_1$, $13_2$, . . . , $13_N$ implemented thereon (referred to collectively as VMs 13). Such virtualization may be achieved utilizing any suitable technique now known or later discovered. Within each VM 13, a guest OS is executing, such as guest $OS_1$ $502_1$ in VM $13_1$, guest $OS_2$ $502_2$ in VM $13_2$, and guest $OS_N$ $502_N$ in VM $13_N$. Further, one or more applications may be executing within each VM $13_1$ such as application C 501C in VM $13_1$, application A 501A in VM $13_2$, and application B 501B in VM $13_N$. VMM 41 is implemented, which is a software layer that virtualizes the available resources of computer system 500 and multiplexes them among the various VMs 13 (e.g., the various guest OSs) on the computer system.

System 500 further includes CPU 11, and various shared resources of which VMM 41 manages access by the various VMs 13. The system's shared resources include I/O resources, such as network interfaces 54A and 54B (e.g., any of a variety of different network interface cards (NICs) and/or adapters), which enables system 500 to interface to communication network 55 (which may be a local area network (LAN), the Internet or other Wide Area Network (WAN), an intranet, a wireless network, telephony network, any combination of the aforementioned networks, and/or any other communication network now known or later developed within the networking arts which permits two or more computers to communicate with each other). The shared resources may include any number of other resources $56_1$, . . . , $56_N$ to which VMM 41 manages access of the VMs 13, examples of which include without limitation memory (e.g., RAM) and block data storage (e.g., disks).

Further, in this example, each of the device drivers for accessing network interfaces 54A and 54B is arranged in an isolated driver domain 14. More specifically, device driver 504A for supporting access to network interface 54A is arranged in net-IDD 14A, which also includes an OS 505A. Device driver 504B for supporting access to network interface 54B is arranged in net-IDD 14B, which also includes an OS 505B. Other device drivers for supporting access to other system resources, such as resources $56_1$, . . . , $56_N$, may likewise be arranged in other IDDs, which are not shown in FIG. 5 for simplicity. Thus, any number "N" of device drivers may be isolated in separate driver domains in this manner, thus resulting in any number "N" of IDDs 14.

The VMs 13 communicate through a virtualized interface to the appropriate network driver domain 14 for accessing a given shared resource (e.g., a shared network device driver), as described further herein. In the example shown in FIG. 5, VM $13_1$ communicates through a virtualized interface with device driver 504B of net-IDD 14B for accessing network interface 54B. Similarly, each of VMs $13_2$ and $13_N$ communicates through a virtualized interface with device driver 504A for accessing network interface 54A. Such virtualized interface may be implemented in any suitable manner. In the example shown in FIG. 5, the virtualized interfaces for supporting communication between the VMs and the net-IDDs comprise a front-end interface and a back-end interface. For instance, in the example shown in FIG. 5, the virtualized interface for supporting communication between VM $13_1$ and device driver 504B of net-IDD 14B comprises a back-end interface $503B_{back}$ implemented in net-IDD 14B and a front-end interface $503B_{front}$ implemented in VM $13_1$. Similarly, in the example shown in FIG. 5, net-IDD 14A implements a back-end interface $503A_{back}$ for supporting communication between VMs $13_2$ and $13_N$ and device driver 504A of net-IDD 14A. VM $13_2$ comprises a front-end interface $503A_{front}$, and VM $13_N$ comprises a front-end interface $503C_{front}$. Exemplary implementations of the virtualized interfaces (e.g., front-end and back-end interfaces) are described further in concurrently filed U.S. patent application Ser. No. 11/493, 492 titled "SYSTEM AND METHOD FOR ATTRIBUTING TO A CORRESPONDING VIRTUAL MACHINE CPU UTILIZATION OF A NETWORK DRIVER DOMAIN BASED ON WEIGHTED COMMUNICATION", the disclosure of which is incorporated herein by reference. Of course, while VM $13_1$ is shown as accessing network interface 54B via net-IDD 14B by communicating through the virtualized interface comprising front-end virtual interface $503B_{front}$ and back-end virtual interface $503B_{back}$, in other instances VM $13_1$ may access other system resources via their respective IDDs by communicating through the corresponding virtualized interfaces, such as accessing network interface 54A via net-IDD 14A by communicating through the back-end virtual interface $503A_{back}$. Similarly, while VM $13_2$ and VM $13_N$ are shown as accessing network interface 54A via net-IDD 14A by communicating through their respective virtualized interfaces, in other instances VMs $13_2$ and/or $13_N$ may access other system resources via their respective IDDs by communicating through the corresponding virtualized interfaces.

As can be seen in FIG. 5, all communication between a VM and a device driver of an IDD flows through the corresponding virtualized interface. For instance, in the example of FIG. 5, all communication between VMs and net-IDD 14A flows through the back-end virtual interface $503A_{back}$, and all communication between VMs and net-IDD 14B flows through the back-end virtual interface $503B_{back}$. Thus, an accurate measurement of the amount of communication between a VM and a net-IDD can be determined through observing the flow of communication through such virtualized interfaces (e.g., through the net-IDD's respective back-end virtual interface). Thus, in the exemplary embodiment of FIG. 1, a communication monitor 506A is employed for monitoring communication through the virtualized back-end interface $503A_{back}$, and a communication monitor 506B is employed for monitoring communication through virtualized back-end interface $503B_{back}$. Of course, a communication monitor need not be implemented for observing the virtualized interface of every IDD of a system, if not so desired.

Each communication monitor 506A-506B may, for example, count the number of communication units flowing between any VM and the corresponding net-IDD. A communication unit generally refers to a unit of data that is employed for communication between a VM and a given IDD. For instance, communication monitor 506A may count the number of network packets flowing through virtualized back-end interface $503A_{back}$ between VM $13_2$ and net-IDD 14A; and communication monitor 506A may likewise count the number of network packets flowing through virtualized back-end interface $503A_{back}$ between VM $13_N$ and net-IDD 14A.

As described further in concurrently filed U.S. patent application Ser. No. 11/493,492 titled "SYSTEM AND METHOD FOR ATTRIBUTING TO A CORRESPONDING VIRTUAL MACHINE CPU UTILIZATION OF A NETWORK DRIVER DOMAIN BASED ON WEIGHTED COMMUNICATION", the disclosure of which is incorporated herein by reference, communication monitors 506A and/or 506B may detect certain characteristics of the observed communication, and based on the characteristics determine a "weighted" amount of observed communication. That is, the weighting of observed communication between a given VM and net-IDD may be determined based on characteristics of such observed communication, such as the size of the communication units (e.g., network packets) observed and/or the direction of the communication units observed.

As an example of one characteristic on which weighting of the observed communication may be at least partly based, the size of communication units (e.g., network packets) may, in some systems, affect the amount of CPU utilization by the net-IDD's device driver in processing such communication units. For example, suppose VM $13_2$ communicates network packets having size of 100 bytes each, while VM $13_N$ communicates network packets having size of 1500 bytes each; in certain systems, device driver 504A of net-IDD 14A may consume more CPU utilization for processing the larger network packets of VM $13_N$ than for processing the smaller network packets of VM $13_2$. Thus, the weighting assigned by communication monitor 506A to the observed communication units (e.g., packets) may differ depending on the size of the communication units. For instance, a greater weighting may be assigned for the observed larger packets of VM $13_N$ than for the observed smaller packets of VM $13_2$. However, in certain systems the size of the packets may not significantly impact the amount of CPU utilization of device driver 504A, and thus the weighting of the observed communication by communication monitor 506A may not be based on this size characteristic in some systems. An exemplary benchmarking technique is described further in concurrently filed U.S. patent application Ser. No. 11/493,492 titled "SYSTEM AND METHOD FOR ATTRIBUTING TO A CORRESPONDING VIRTUAL MACHINE CPU UTILIZATION OF A NETWORK DRIVER DOMAIN BASED ON WEIGHTED COMMUNICATION", the disclosure of which is incorporated herein by reference, for determining for a target system a weighting, if any, to be used for this size characteristic of observed communication for the system.

As another example of a characteristic on which weighting of the observed communication may be at least partly based, the direction of the observed communication units (e.g., network packets) may, in some systems, affect the amount of CPU utilization by the net-IDD's device driver in processing such communication units. As shown in the example of FIG. 5, communication between a VM and a network driver domain may be bi-directional, wherein certain communication units flow from the VM to the network driver domain (e.g., to be communicated over the communication network 55), while other communication units are received by the network driver domain from the communication network 55 and flow from the network driver domain to the proper VM.

As an example, FIG. 5 shows that communication may flow from VM $13_1$ to device driver 504B of net-IDD 14B along a first direction $508_{send}$ (e.g., a "send" direction) of a communication path between the VM $13_1$ and net-IDD 14B; and communication may flow from device driver 504B of net-IDD 14B to VM $13_1$ along a second direction $508_{receive}$ (e.g., a "receive" direction) of a communication path between the VM $13_1$ and net-IDD 14B. Similarly, FIG. 5 shows that communication may flow from VM $13_2$ to device driver 504A of net-IDD 14A along a first direction $509_{send}$ (e.g., a "send" direction) of a communication path between the VM $13_2$ and net-IDD 14A; and communication may flow from device driver 504A of net-IDD 14A to VM $13_2$ along a second direction $509_{receive}$ (e.g., a "receive" direction) of a communication path between the VM $13_2$ and net-IDD 14A. Likewise, FIG. 5 shows that communication may flow from VM $13_N$ to device driver 504A of net-IDD 14A along a first direction $510_{send}$ (e.g., a "send" direction) of a communication path between the VM $13_N$ and net-IDD 14A; and communication may flow from device driver 504A of net-IDD 14A to VM $13_N$ along a second direction $510_{receive}$ (e.g., a "receive" direction) of a communication path between the VM $13_N$ and net-IDD 14A. In the exemplary system 500 of FIG. 5, virtualized back-end interface $503A_{back}$ includes logic 511 for determining to which of VMs $13_2$ and $13_N$ communication from device driver 504A is to be directed, and directs the communication to the appropriate VM for which the communication is intended. Thus, by monitoring virtualized back-end interface $503A_{back}$, communication monitor 506A can observe all communication flowing between each of the VMs $13_2$ and $13_N$ and net-IDD 14A along both the send and the receive directional paths.

Generally, CPU utilization of network device driver 504A will differ in its processing of communication along a send path (i.e., communication received by device driver 504A from a VM to be sent out over network 55) versus its processing of communication along a receive path (i.e., communication received by device driver 504A from network 55 to be sent to a VM). For example, in many systems the network device driver consumes more CPU in processing "send" path than for the "receive" path. Accordingly, communication monitor 506A may weight the observed communication differently depending at least in part on the directional flow of such communication.

CPU utilization monitor 31 may receive from communication monitor 506A a value corresponding to a weighted amount of communication (e.g., number network packets weighted based on their respective characteristics, such as size and/or directional flow) communicated through virtualized back-end interface $503A_{back}$ between VM $13_2$ and net-IDD 14A, and CPU utilization monitor 31 may also receive a value corresponding to a weighted amount of communication (e.g., number network packets weighted based on their respective characteristics, such as size and/or directional flow) communicated through virtualized back-end interface $503A_{back}$ between VM $13_N$ and net-IDD 14A. Based at least in part on the respective values received for each of VM $13_2$ and $13_N$, CPU utilization monitor 31 may determine a corresponding amount of CPU utilization by the net-IDD 14A that is attributable to each of such VMs $13_2$ and $13_N$.

Communication monitors 506A and/or 506B, CPU utilization monitor 31, and/or aggregate proportional-share scheduler 12 may be software programs stored to a computer-readable medium (e.g., memory, hard disk, optical disc, magnetic disk, or any other data storage device now known or later developed) and executing on a processor-based device, such as a personal computer (PC), laptop computer, server computer, etc. Of course, the functionality of the communication monitors and/or CPU utilization monitor may be implemented in software, hardware, firmware, or any combination thereof. Thus, the communication monitors and/or CPU utilization monitor may be employed as any type of evaluation logic, whether software, hardware, firmware, or any combination thereof.

Figure 6:
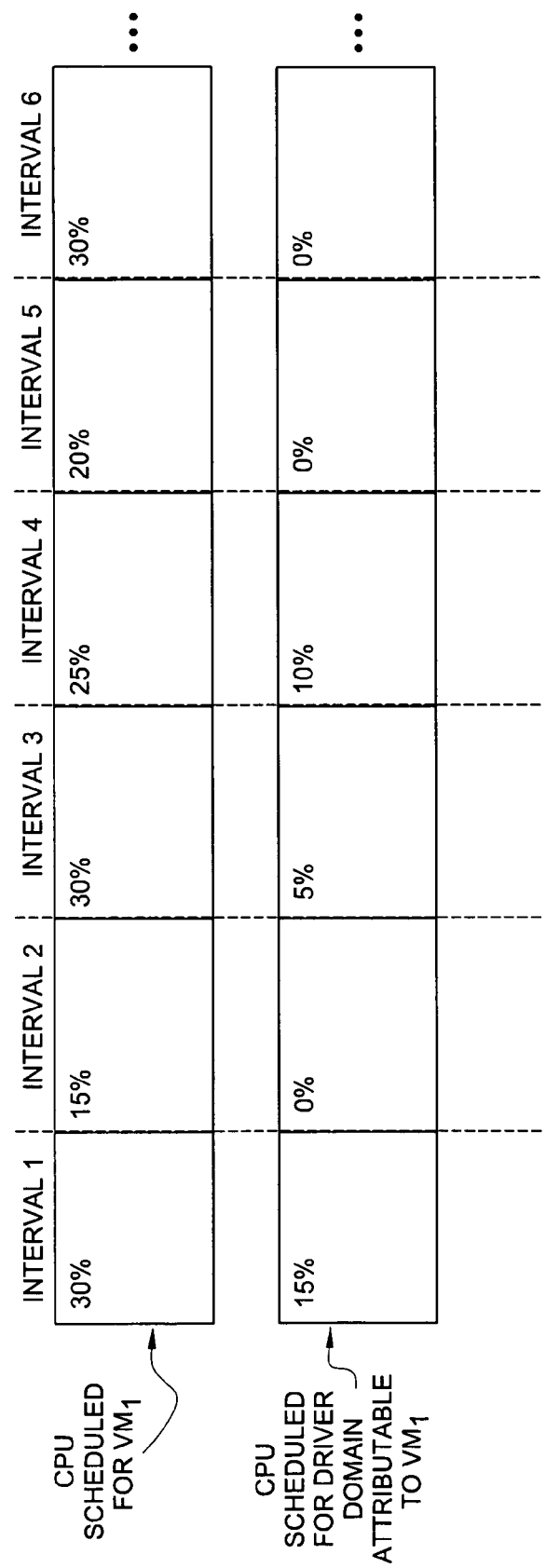
FIG. 6 shows an exemplary scheduling scenario according to one embodiment of the present invention.

FIG. 6 shows an exemplary scheduling scenario according to one embodiment of the present invention. In this example, 6 scheduling intervals, which may be 100 ms each for example, are shown. The graph of FIG. 6 shows an amount of the scheduling interval that is allocated by an embodiment of the aggregate proportional-share scheduler 12 to a given VM, $VM_1$. Suppose for this scenario that $VM_1$ is weighted such that its proportional share of each scheduling interval is 30% (i.e., 30 ms). Also shown in the graph of FIG. 6 is an amount of CPU scheduled for a driver domain 14 in each scheduling interval which is attributable to $VM_1$. In the exemplary scenario of FIG. 6, $VM_1$ is allocated a 30% share of scheduling interval 1. Additionally, during scheduling interval 1 driver domain 14 is allocated a 15% share that is attributable to $VM_1$ (e.g., driver domain 14 uses a 15% share of CPU in interval 1 on behalf of $VM_1$). Thus, $VM_1$ effectively receives an aggregate 45% share of CPU in interval 1, which exceeds its proportional share of 30%.

Accordingly, in the next scheduling interval, interval 2, the aggregate proportional-share scheduler 12 allocates a 15% share of the interval to $VM_1$. This, brings the overall CPU allocated to $VM_1$ over intervals 1 and 2 back to the 30% proportion. In interval 2, driver domain 14 receives no CPU allocation that is attributable to $VM_1$. So, in interval 3, the scheduler 12 allocates a 30% share to $VM_1$. Additionally, in interval 3 the scheduler allocates to driver domain 14 a 5% share that is attributable to $VM_1$. Because in interval 4 it is determined that $VM_1$ effectively received an additional 5% share of CPU usage in interval 3 (i.e., the 5% usage of driver domain 14 that is attributable to $VM_1$), the scheduler 12 adjusts the allocation of interval 4 to 25% for $VM_1$.

Additionally, in interval 4 a 10% share is scheduled for driver domain 14, which is attributable to VM1. Thus, because in interval 5 it is determined that $VM_1$ effectively received an additional 10% share of CPU usage in interval 4 (i.e., the 10% usage of driver domain 14 that is attributable to $VM_1$), the scheduler 12 adjusts the allocation of interval 5 to 20% for $VM_1$. In the exemplary scenario of FIG. 6, driver domain 14 is allocated no CPU that is attributable to $VM_1$ in interval 5, and thus in interval 6 the scheduler allocates the full proportional share (i.e., 30%) to $VM_1$.

As can be seen by the example of FIG. 6, in this embodiment, the aggregate proportional-share scheduler 12 adjusts the amount of CPU allocated to a given VM in one scheduling interval to account for any extra CPU utilized on behalf of the VM by a driver domain in a previous scheduling interval. That is, for each scheduling interval, the VM is allocated its proportional share minus any share of CPU usage of a driver domain in a previous scheduling interval that is attributable to the VM. Thus, in this exemplary embodiment, the aggregate proportional-share of a VM for a given scheduling interval is computed by subtracting any share of CPU usage of a driver domain in a previous domain that is attributable to the VM from the proportional share that the VM would otherwise receive for the given scheduling interval.

Figure 7:
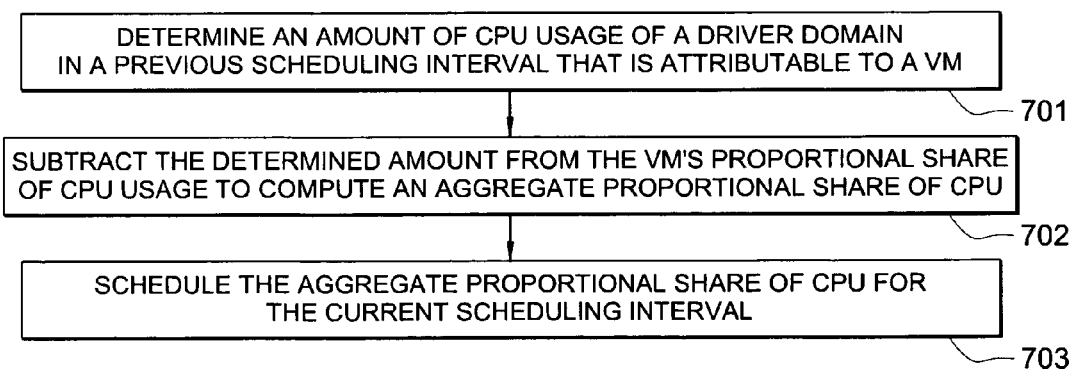
FIG. 7 shows an exemplary operational flow diagram according to one embodiment of the present invention.

Turning to FIG. 7, an exemplary operational flow diagram according to one embodiment is shown. In operational block 701, an amount of CPU usage of a driver domain in a previous scheduling interval that is attributable to a VM is determined. In block 702, the determined amount is subtracted from the VM's proportional share of CPU usage to compute an aggregate proportional share of CPU for the VM. For instance, in the above example of FIG. 6, $VM_1$ is weighted so as to have a proportional share of 30% for each scheduling interval. However, in block 702, a determined amount of CPU usage of a driver domain in a previous scheduling interval that is attributable to $VM_1$ is subtracted from $VM_1$'s 30% proportional share to compute an aggregate proportional share of CPU for $VM_1$. In block 703, the aggregate proportional-share scheduler 12 schedules the aggregate proportional share of CPU for the VM for the current scheduling interval.

An exemplary embodiment of aggregate proportional-share scheduler 12 which is implemented by modifying the well-known Simple Earliest Deadline First (SEDF) scheduler is now described. The SEDF scheduler provides weighted CPU sharing in an intuitive way and uses real-time algorithms to ensure time guarantees. Such SEDF scheduler may be used for scheduling CPU usage for different VMs (or "domains").

Traditionally, such a proportional-share CPU scheduler is based on a description that specifies a fraction of CPU that should be allocated to different VMs as well as IDDs, i.e. each $VM_i$ and each $IDD_k$ should specify the CPU share that is allocated by a scheduler. Such traditional proportional-share CPU schedulers offer no way to enforce a policy that allocates combined X % CPU share to a particular $VM_i$ over time such that $X=X_i+Y_k$ where $X_i$ is CPU usage by $VM_i$ and $Y_k$ is CPU usage by $IDD_k$ as a result of I/O processing on behalf of the guest domain $VM_i$.

The SEDF scheduler is briefly described as one example of a weighted proportional-share scheduler that may be adapted according to an embodiment of the present invention for supporting a policy that allocates combined X % CPU share to a particular $VM_i$ over time such that $X=X_i+Y_k$ where $X_i$ is CPU usage by $VM_i$ and $Y_k$ is CPU usage by $IDD_k$ as a result of I/O processing on behalf of the guest domain $VM_i$.

Consider that each domain $Dom_i$ specifies its CPU requirements by a pair $(s_i, p_i)$, where the slice $s_i$ and the period $p_i$ together represent a CPU share that $Dom_i$ requests: $Dom_i$ will receive at least $s_i$ units of time in each period of length $p_i$. The SEDF scheduler maintains 3 queues:

1) $Q_r$—a queue of runnable domains;
2) $Q_w$—a queue of domains that have exhausted their slice and are waiting for the next period; and
3) $Q_b$—a queue of blocked domains.

For each domain $Dom_i$, the scheduler keeps track of two additional values ($d_i$, $r_i$):

$d_i$—domain's current deadline for CPU allocation, which is the time at which the current period of domain $Dom_i$ ends; and $r_i$—domain's current remaining time for CPU allocation, which is the CPU time remaining to domain $Dom_i$ within its current period.

SEDF uses a notion of deadlines to pick the domain to be scheduled next. Intuitively, deadline denotes the absolute time by which a domain should have received its specified share of the CPU. Note that this differs from the period because the period only specifies a "window" or interval of time, whereas deadline is a specific point in absolute time.

Both $Q_r$ and $Q_w$ are kept sorted by deadlines, which makes picking the next domain to be scheduled a constant time operation. This does not mean, however, that the scheduler is O(1), since some other work also needs to be done.

To begin with, each domain $D_i$'s deadline is set to NOW+$p_i$, where NOW denotes the current, real time. As a brief description of how the queues are updated on each invocation of the scheduler:

1) The time $gotten_i$ for which the current $Dom_i$ has been running is deducted from its value $r_i$, i.e. $r_i = r_i - gotten_i$.

2) If, as a result, a remaining time $r_i$ becomes equal to 0, i.e. $r_i = 0$, then $Dom_i$ is moved from $Q_r$ to $Q_w$. This means that $Dom_i$ has received its required CPU time in the current period.

3) For each domain $Dom_k$ in $Q_w$, if $NOW \geq d_k$, then the following updates are performed:
  a) $r_k$ is reset to $s_k$, i.e. $r_k = s_k$;
  b) the new deadline is set to $d_k + p_k$, i.e. $d_k = d_k + p_k$; and
  c) $Dom_k$ is moved from $Q_w$ to $Q_r$.

4) The next timer interrupt is scheduled for $\min(d_w^h + p_w^h, d_r^h)$, where $d_w^h$, $p_w^h$ and $d_r^h$, $p_r^h$ denote the deadline and period of the domains that are respective heads of $Q_r$ and $Q_w$ queues.

5) On the interrupt, the scheduler runs the head of $Q_r$. If $Q_r$ is empty, it selects an element of $Q_w$.

6) When domain $Dom_k$ in $Q_b$ is unblocked, it is moved from $Q_b$ to $Q_r$ and if $NOW \geq d_k$, then the following updates are performed:
  a) $r_k$ is reset to $s_k$ i.e. $r_k = s_k$; and
  b) the new deadline is set to $d_k + p_k$, i.e. $d_k = d_k + p_k$.

According to one embodiment, the above-described SEDF scheduler is modified to provide an embodiment of an aggregate proportional-share scheduler, which may be referred to herein as SEDF-Debt Collector (or "SEDF-DC"). The exemplary SEDF-DC scheduler is operable to allocate combined X/o CPU share to a particular $VM_i$ over time such that $X = X_i + Y_k$, where $X_i$ is CPU usage by $VM_i$ and $Y_k$ is CPU usage by $IDD_k$ as a result of I/O processing on behalf of the guest domain $VM_i$. Let f denote a feedback interval (for efficiency reasons, it can be set in a range of 10-100 ms, for example). Further, let net-IDD be a driver domain with a networking device that is shared by $Dom_1, \ldots, Dom_n$. The following algorithm description is simplified (without losing generality) by considering a single driver domain net-IDD.

Using a CPU utilization monitor 31, such as described above, information about CPU usage by net-IDD is collected every f ms interval, and a fraction of CPU time $used_i^{IDD}$ that was used by net-IDD for networking processing on behalf of $Dom_i$ ($1 \leq i \leq n$) during the latest f ms interval is computed.

This value is provided to the SEDF-DC scheduler at each f ms interval and is expressed in ms.

For each domain $Dom_i$, the scheduler keeps track of three values ($d_i$, $r_i$, $debt_i^{IDD}$), where a) $d_i$—domain's current deadline for CPU allocation, which is the time at which the current period of domain $Dom_i$ ends;

b) $r_i$—domain's current remaining time for CPU allocation, which is the CPU time remaining to domain $Dom_i$ within its current period;

c) $debt_i^{IDD}$—already implicitly consumed CPU time by $Dom_i$ via net-IDD's networking processing performed on behalf of $Dom_i$, which is referred to as CPU debt for $Dom_i$. At each f ms interval, this value is incremented by newly computed $used_i^{IDD}$ for the latest f ms interval, i.e. $debt_i^{IDD} = debt_i^{IDD} + used_i^{IDD}$.

Let a and b be integer numbers, the following function $a \dot{-} b$ is introduced as follows:

$$a \dot{-} b = \begin{cases} 0 & \text{if } a \leq b \\ a - b & \text{otherwise} \end{cases}.$$

Below, a modified procedure is described for how the queues ($Q_r$, $Q_w$ and $Q_b$) are updated on each invocation of the exemplary SEDF-DC scheduler:

1) The time $gotten_i$ for which the current $Dom_i$ has been running is deducted from its value $r_i$, i.e. $r_i = r_i - gotten_i$. If $debt_i^{IDD} > 0$, then the SEDF-DC scheduler attempts to charge $Dom_i$ for its CPU debt by decreasing the remaining time of its CPU slice as follows:
  a) if $debt_i^{IDD} \leq r_i$, then $r_i = r_i - debt_i^{IDD}$ and $debt_i^{IDD} = 0$; and
  b) if $debt_i^{IDD} < r_i$, then $debt_i^{IDD} = debt_i^{IDD} - r_i$ and $r_i = 0$.

2) If a remaining time $r_i$ becomes equal to 0, i.e. $r_i = 0$, then $Dom_i$ is moved from $Q_r$ to $Q_w$. This means that $Dom_i$ has received its required CPU time in the current period.

3) For each domain $Dom_k$ in $Q_w$, if $NOW \geq d_k$, then the following updates are performed:
  a) $r_k$ is reset to $s_k \dot{-} debt_k^{IDD}$;
  b) $debt_k^{IDD}$ is decreased by $\min(s_k, debt_k)$;
  c) the new deadline is set to $d_k + p_k$; and
  d) If $r_k > 0$, then $Dom_k$ is moved from $Q_w$ to $Q_r$.

4) The next timer interrupt is scheduled for $\min(d_w^h + p_w^h, d_r^h)$, where $d_r^h$, $p_w^h$ and $d_r^h$, $p_r^h$ denote the deadline and period of the domains that are respective heads of $Q_r$ and $Q_w$ queues.

5) On the interrupt, the exemplary SEDF-DC scheduler runs the head of $Q_r$. If $Q_r$ is empty, it selects an element of $Q_w$.

6) When domain $Dom_k$ in $Q_b$ is unblocked, the following updates are taken depending on the conditions:
  a) if $NOW < d_k$, then
    i) if $debt_k^{IDD} \leq r_k$, then $r_k = r_k - debt_k^{IDD}$, and $debt_k^{IDD} = 0$, and $Dom_k$ is moved from $Q_b$ to $Q_r$.
    ii) if $debt_k^{IDD} > r_k$, then $debt_k^{IDD} = debt_k^{IDD} - r_k$ and $r_k = 0$.
  b) if $NOW \geq d_k$, then SEDF-DC computes for how many periods $Dom_k$ was blocked and charges this unused CPU time against the CPU debt of $Dom_k$ as follows:

$$bl\_periods = int\left(\frac{(NOW - d_k)}{p_k}\right),$$

and $debt_k^{IDD} = debt_k^{IDD} - r_k - bl\_periods \times s_k$.
  c) $r_k$ is reset to $s_k \dot{-} debt_k^{IDD}$. If remaining time $r_k$ is positive, i.e. $r_k > 0$, then $Dom_k$ is moved from $Q_b$ to $Q_r$.

d) $debt_k^{IDD}$ is decreased by $s_k$, more precisely: $debt_k^{IDD} = debt_k^{IDD} - s_k$.

e) the new deadline is set to $d_k + p_k$, i.e. $d_k = d_k + p_k$.

The above-described exemplary SEDF-DC scheduler supports a policy that allocates combined X % CPU share to a particular $VM_i$ over time such that $X = X_i + Y_k$ where $X_i$ is CPU usage by $VM_i$ and $Y_k$ is CPU usage by $IDD_k$ as a result of I/O processing on behalf of the guest domain $VM_i$. However, there are constraints on initial parameters for CPU allocation to net-IDD and $Dom_i$ in order for this exemplary algorithm to work correctly. For instance, let us denote initially specified CPU allocation of net-IDD as $A^{IDD}$ and initially specified CPU allocation of $Dom_i$ as $A_i$. First of all, net-IDD should be allocated a smaller CPU share than $Dom_i$, i.e. $A^{IDD} \leq A_i$. Otherwise, the combined (or "aggregate") CPU usage of $Dom_i$ can be $A^{IDD}$, because net-IDD can consume $A^{IDD}$ of CPU amount on behalf of $Dom_i$. When net-IDD is allocated a larger CPU share than $Dom_i$, i.e. $A^{IDD} > A_i$, the exemplary SEDF-DC scheduler only can guarantee that combined CPU usage of $Dom_i$ can be less or equal to $A^{IDD}$.

For example, let net-IDD be allocated a smaller CPU share than $Dom_i$, i.e. $A^{IDD} \leq A_i$. To describe the QoS guarantees on CPU usage provided by the exemplary SEDF-DC, let us consider a sequence of time intervals $T_1, T_2 \ldots, T_N$ each of duration f ms that represent the duration of the algorithm feedback loop. Let $CPU_i(T_k)$ denote CPU usage by $Dom_i$ during time interval $T_k$. Similarly, let $CPU^{IDD}(T_k)$ denote CPU usage by net-IDD on behalf of $Dom_i$ during time interval $T_k$. Let us denote $combCPU_i(T_k) = CPU_i(T_k) + CPU^{IDD}(T_k)$. During the first time interval, $T_1$, the combined CPU usage by $Dom_i$ is $CPU_i(T_1) + CPU^{IDD}(T_1)$.

Note that $CPU^{IDD}(T_k - i)$ represents a CPU debt of $Dom_i$ that is "claimed" against its CPU allocation in the next time interval, $T_k$. During the k-th time interval, $CPU^{IDD}(T_{k-1})$ is charged against $Dom_i$ CPU usage and it is guaranteed by the scheduler that $CPU_i(T_2) \leq A_i - CPU^{IDD}(T_1)$. Hence, it is guaranteed that $CPU_i(T_k) + CPU^{IDD}(T_{k-1}) \leq A_i$.

Let us now consider time interval $T = (T_1, T_N)$ and compute a combine CPU usage by $Dom_i$ across T:

$$combCPU_i(T) = \frac{\sum_{1 \leq k \leq N}(CPU_i(T_k) + CPU^{IDD}(T_k))}{N}.$$

This can be rewritten in a slightly different way as:

$$combCPU_i(T) = \frac{CPU_i(T_1) + CPU^{IDD}(T_N) + \sum_{1 \leq k \leq N-1}(CPU_i(T_{k+1}) + CPU^{IDD}(T_k))}{N}.$$

Since for any k; such that $1 \leq k \leq N-1$, the following holds: $CPU_i(T_{k+1}) + CPU^{IDD}(T_k) \leq A_i$, we can assert that over time: $combCPU_i(T) \leq A_i$, and therefore the exemplary SEDF-DC scheduler supports promised QoS guarantees.

Consider the following results of an exemplary case study conducted for the above-described SEDF-DC scheduler. In this case study, ee designed an experiment, in which we used three domains: $Dom_0$, $Dom_1$, and $Dom_2$. In this setting, $Dom_0$ played a role of net-IDD and hosted network device driver. Equal share was allocated to these domains. That is, the domains were equally weighted for the CPU scheduler. Thus, at a first glance, the applications in $Dom_1$ and $Dom_2$ have been allocated the same CPU share of 31% (theoretically, it should be 33% but in practice it is 31% due to some additional CPU system overhead).

Domain $Dom_1$ was running a web server (Apache HTTP server version 2.0.40). We used the httperf tool for sending the client requests. We ran the tests with monotonically increasing request rates, until we saw that the reply rate leveled off and the server became saturated, i.e., it was operating at its full capacity. We instructed httperf client to retrieve a fixed size file of 10 KB. Domain $Dom_2$ was running a CPU loop application, that is continuously consuming CPU cycles.

Figure 8A:
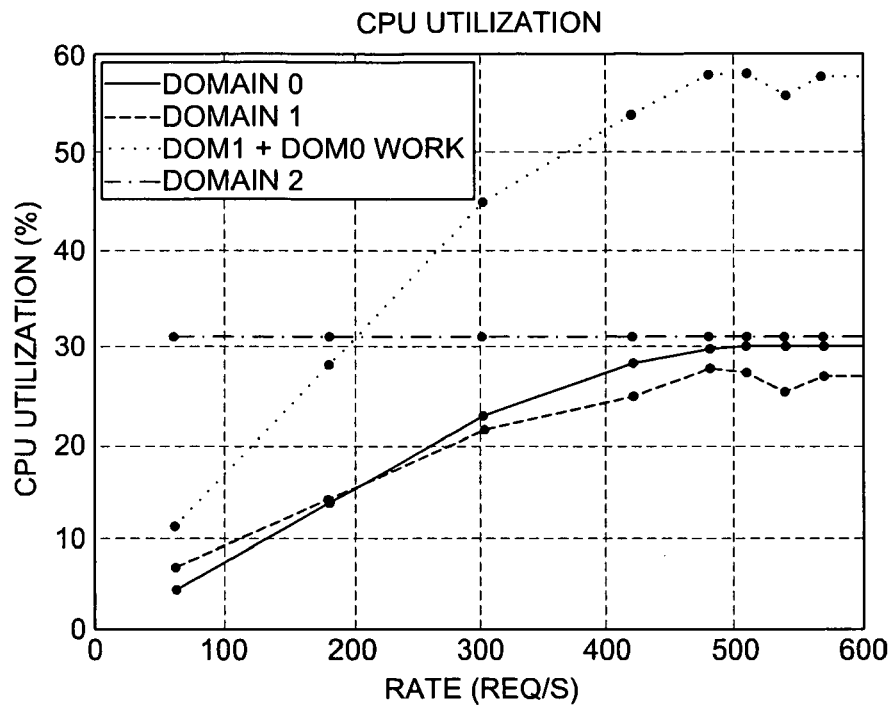
FIG. 8A shows the CPU consumption across various virtual machines when a traditional SEDF scheduler was used for CPU scheduling in an exemplary case study.

FIG. 8A shows the CPU consumption across $Dom_0$, $Dom_1$, and $Dom_2$ when a traditional SEDF scheduler was used for CPU scheduling in this case study. Domain $Dom_2$ has consistently consumed the entire CPU amount (around 31%) while running the CPU intensive application. $Dom_0$, and $Dom_1$, got approximately the same amount of CPU, approaching to 30% of CPU share under heavy load. An interesting outcome is that $Dom_0$ was doing network processing on behalf of $Dom_1$ and hence its CPU usage should be charged to $Dom_1$. As a result, $Dom_1$ has used almost double amount of CPU compared to $Dom_2$.

Figure 8B:
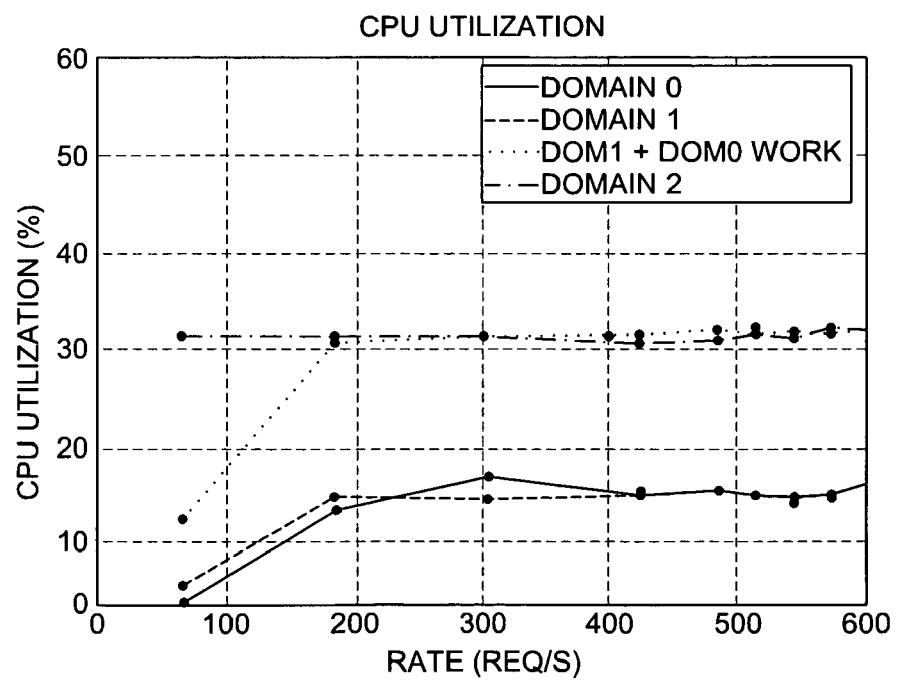
FIG. 8B shows the CPU consumption across various virtual machines when an exemplary embodiment of an aggregate proportional-share scheduler, SEDF-DC, with feedback was used for CPU scheduling in the exemplary case study.

FIG. 8B shows the CPU consumption across $Dom_0$, $Dom_1$, and $Dom_2$ when the above-described SEDF-DC scheduler with feedback was used for CPU scheduling in this exemplary case study. We specified that $Dom_1$ and $Dom_2$ should get the same CPU share, but in the case of $Dom_1$, it should be a combined CPU usage by $Dom_0$ and $Dom_1$. FIG. 8B shows that the exemplary SEDF-DC scheduler achieves desirable CPU allocation and the combined CPU usage by $Dom_0$ and $Dom_1$ is the same (or less) as $Dom_2$ CPU usage.

It should be recognized that while an exemplary SEDF-DC scheduler is described above, embodiments of the present invention are not limited to adapting the SEDF scheduler, but may likewise be employed for any weighted proportional-share scheduler now known or later developed. The exemplary aggregate proportional-share scheduler 12 described herein, when implemented via computer-executable instructions, is in essence the software code defining the operations thereof. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information. In certain embodiments, a CPU may execute the various logical instructions according to embodiments of the present invention. For example, a CPU may execute machine-level instructions according to the exemplary operational flows described above in conjunction with FIGS. 2A-2B and 7.

It shall be appreciated that the present invention is not limited to the architecture of the system on embodiments thereof may be implemented. For example, any suitable processor-based device may be utilized for implementing the above-described operations, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

What is claimed is:

1. A method comprising:
   allotting a proportional share of usage of a central processing unit (CPU) to a given virtual machine (VM) of a plurality of VMs based on a relative weight assigned to the given VM, wherein the allotted proportional share corresponds to the maximum CPU usage that may be scheduled for the given VM for any scheduling interval, wherein the plurality of VMs use at least one driver domain;
   determining an actual aggregate usage of the CPU attributable to the given VM during a first scheduling interval, wherein said actual aggregate usage of CPU includes a determined amount of CPU usage by the at least one driver domain that is attributable to the given VM and a determined amount of CPU usage by the given VM;
   determining, by a processor-based machine, an amount of CPU usage to provide for use by the given VM during a second scheduling interval by adjusting the allotted proportional share that may be scheduled for the given VM based on the determined amount of CPU usage by the at least one driver domain attributable to the given VM during the first scheduling interval; and
   scheduling, by an aggregate proportional-share scheduler, the determined amount of CPU usage to provide for use by the given VM for the second scheduling interval.

2. The method of claim 1 further comprising:
   determining an aggregate usage of CPU attributable to each of the plurality of VMs, wherein said aggregate usage of CPU attributable to each of the plurality of VMs includes a determined amount of CPU usage by a driver domain that is attributable to the corresponding VM and a determined amount of CPU usage by the corresponding VM; and
   scheduling, by the aggregate proportional-share scheduler, CPU usage for each of the plurality of VMs based at least in part on their respective aggregate usage of CPU.

3. The method of claim 2 wherein said scheduling comprises:
   scheduling CPU usage for each of the plurality of VMs in a manner that provides aggregate use of CPU by each of the plurality of VMs in proportion to their respective assigned weights.

4. The method of claim 1, further comprising:
   subtracting the determined amount of CPU usage of the driver domain in the first scheduling interval that is attributable to the given VM from the allotted proportional share of CPU usage for the given VM to determine the amount of CPU usage to provide to the given VM for the second scheduling interval.

5. The method of claim 1 further comprising:
   defining a policy that allocates combined X % CPU share to the given VM over time such that $X=X_i+Y_k$ where $X_i$ is CPU usage by the given VM and $Y_k$ is CPU usage by the driver domain that is attributable to the given VM.

6. The method of claim 5 further comprising:
   enforcing, by the aggregate proportional-share scheduler, the defined policy.

7. The method of claim 5 wherein $Y_k$ is CPU usage by the driver domain as a result of the driver domain performing input/output (I/O) processing on behalf of the given VM.

8. A system comprising:
   at least one central processing unit (CPU);
   a plurality of virtual machines (VMs);
   at least one driver domain that comprises a device driver for use by the VMs for accessing a shared resource; and
   an aggregate proportional-share CPU scheduler to schedule access to the at least one CPU for the plurality of VMs such that an aggregate CPU usage for each VM is maintained in proportion to a respective weight assigned to the each VM, wherein the aggregate CPU usage for each VM corresponds to an aggregate of CPU usage by the VM and CPU usage by the at least one driver domain that is attributable to the VM, wherein each VM is allotted a maximum amount of CPU usage that may be scheduled for the each VM for any scheduling interval based on its respective weight, and wherein the scheduler is to maintain the aggregate CPU usage for each VM in proportion to the respective assigned weight during a current scheduling interval by adjusting the allotted maximum amount of CPU usage for each VM that may be scheduled for the each VM based on the amount of actual CPU usage by the at least one driver domain that was attributable to the each VM during a previous scheduling interval.

9. The system of claim 8 further comprising:
   a CPU utilization monitor to determine the aggregate CPU usage for each of the VMs.

10. The system of claim 8 wherein the at least one driver domain comprises an isolated driver domain in which a device driver for network communication resides.

11. The system of claim 8 wherein the shared resource comprises a communication network.

12. The system of claim 8 wherein the aggregate proportional-share scheduler comprises a modified Simple Earliest Deadline First (SEDF) scheduler.

13. The system of claim 8 wherein the aggregate proportional-share scheduler is operable to enforce a predefined policy that allocates combined X % CPU share to a VM, of the plurality of VMs over time such that $X=X_i+Y_k$ where $X_i$ is CPU usage by the $VM_i$ and $Y_k$ is CPU usage by the at least one driver domain that is attributable to the $VM_i$.

14. Computer-executable software code stored in non-transitory computer-readable medium, the computer-executable software code executable by a processor to:
   determine a proportional share of usage of a central processing unit (CPU) for a given virtual machine (VM) of a plurality of VMs, wherein the proportional share corresponds to the maximum CPU usage that may be scheduled for the given VM for any scheduling interval, wherein the plurality of VMs use at least one driver domain;
   determine CPU usage of the given VM;
   determine CPU usage by a driver domain that is attributable to the given VM;
   determine an aggregate CPU usage for the given VM in a first scheduling interval, wherein the aggregate CPU usage comprises an aggregate of the determined CPU usage of the given VM and the determined CPU usage by the at least one driver domain that is attributable to the given VM;
   determine an amount of CPU usage to provide for use by the given VM during a second scheduling interval by adjusting the maximum CPU usage that may be scheduled based at least in part on the determined CPU usage by the at least one driver domain that is attributable to the given VM during the first scheduling interval; and
   schedule the determined amount of CPU usage to provide for use by the given VM in the second scheduling interval.

15. The computer-executable code of claim 14 wherein the scheduling comprises:
   enforcing a predefined policy that allocates combined X % CPU share to the given VM over time such that $X=X_i+Y_k$ where $X_i$ is CPU usage by the given VM and $Y_k$ is CPU usage by the at least one driver domain that is attributable to the given VM.

* * * * *

UNITED STATES PATENT AND TRADEMARK OFFICE
CERTIFICATE OF CORRECTION

| | |
|---|---|
| PATENT NO. | : 8,032,882 B2 |
| APPLICATION NO. | : 11/493348 |
| DATED | : October 4, 2011 |
| INVENTOR(S) | : Diwaker Gupta et al. |

It is certified that error appears in the above-identified patent and that said Letters Patent is hereby corrected as shown below:

In column 21, line 43, in Claim 4, delete "claim 1," and insert -- claim 1 --, therefor.

In column 22, line 30, in Claim 13, delete "VM," and insert -- $VM_i$ --, therefor.

Signed and Sealed this
Thirteenth Day of November, 2012

David J. Kappos
*Director of the United States Patent and Trademark Office*